(12) United States Patent
Sakaguchi et al.

(10) Patent No.: US 6,778,286 B2
(45) Date of Patent: Aug. 17, 2004

(54) APPARATUS FOR MEASURING DISTORTION OF CYLINDRICAL BODY

(75) Inventors: Iwao Sakaguchi, Nagano (JP); Yoshio Takeshige, Nagano (JP)

(73) Assignee: Minebea Co., Ltd., Nagano-Ken (JP)

( * ) Notice: Subject to any disclaimer, the term of this patent is extended or adjusted under 35 U.S.C. 154(b) by 32 days.

(21) Appl. No.: 10/132,258

(22) Filed: Apr. 26, 2002

(65) Prior Publication Data

US 2002/0159077 A1 Oct. 31, 2002

(30) Foreign Application Priority Data

Apr. 26, 2001 (JP) ........................................ 2001-128941

(51) Int. Cl.$^7$ ................................................ G01B 11/02
(52) U.S. Cl. ...................................................... 356/640
(58) Field of Search ................................. 356/625–640, 356/237.1–237.3, 237; 250/559.2, 559.21, 559.22

(56) References Cited

U.S. PATENT DOCUMENTS 4,410,278 A * 10/1983 Makihira et al. ........... 356/445
4,483,615 A * 11/1984 Bieringer et al. ........ 356/239.1
5,602,646 A * 2/1997 Bernardin et al. ........... 356/426
6,449,034 B1 * 9/2002 Marchand et al. ..... 356/139.03
6,531,672 B2 * 3/2003 Malloy ....................... 209/579

FOREIGN PATENT DOCUMENTS

JP          8-261710           10/1996

* cited by examiner

Primary Examiner—Michael P. Stafira
(74) Attorney, Agent, or Firm—Birch, Stewart, Kolasch & Birch, LLP

(57) ABSTRACT

An apparatus for measuring distortion of a cylindrical body includes: a stationary straight rail provided on a flat surface; a cylindrical-body transfer mechanism for rolling the cylindrical body such that a peripheral surface of one end of the cylindrical body remains in contact with the stationary straight rail; a reference pole disposed at a position separated a predetermined distance from the cylindrical body in a direction perpendicular to the rolling direction of the cylindrical body; a laser scan micrometer capable of simultaneously scanning the top end of the cylindrical body and the reference pole by means of laser beam projected toward the rolling direction to thereby measure a distance between the cylindrical body and the reference pole; and a control section for processing measurement data so as to obtain radial distortion of the cylindrical body.

20 Claims, 6 Drawing Sheets

APPARATUS FOR MEASURING DISTORTION OF CYLINDRICAL BODY

BACKGROUND OF THE INVENTION

1. Field of the Invention

The present invention relates to an apparatus for measuring distortion of a cylindrical body which is suitably used for measurement of radial distortion of a cylindrical body, such as an inner or outer ring of a bearing.

2. Description of the Related Art

In general, when an inner ring Ci or an outer ring Co of a ball bearing M shown in FIG. 8 has a distortion in the radial direction, a raceway groove Cis or a groove Cos for guiding balls B exhibits waviness. When such a ball bearing M is used, axial vibration is generated, making smooth and stable rotation unattainable. Therefore, distortions of the inner ring Ci and the outer ring Co must be minimized. That is, when the inner ring Ci is rotated one turn with the position of its lower end surface Cid fixed, radial distortion Ed as measured at an upper end surface Ciu of the inner ring Ci ideally becomes zero. However, in actuality, some distortion Ed is present and must be reduced to a specified tolerance.

Incidentally, such distortion Ed has conventionally been measured by use of an electronic micrometer as disclosed in, for example, Japanese Patent Application Laid-Open (kokai) No. 8(1996)-261710. FIG. 9 shows a conventional distortion measurement apparatus 60 capable of measuring distortion Ed by use of an electronic micrometer. The distortion measurement apparatus 60 has a holding plate 62 which is disposed on the top face of a base block 61 and has a V-shaped holding depression 62s. A peripheral surface of a lower end of a cylindrical body C (e.g., an inner ring Ci) is brought into contact with the holding depression 62s. A probe 63s of an electronic micrometer 63 is brought into contact with an upper portion of the peripheral surface of the cylindrical body C at a position diametrically opposite the holding depression 62s. During measurement, after a conical portion 64 of a rotation jig 65 is pressed against an inner edge of the cylindrical body C, an operator rotates the cylindrical body C over one turn, and obtains distortion Ed from variation measured by the electronic micrometer 63. When the thus obtained distortion Ed falls outside the specified tolerance, the operator judges the cylindrical object to be defective.

However, such a conventional distortion measurement apparatus 60 has the following drawbacks.

First, because of mechanical contact involved in measurement, measurement error increases, especially in measurement of a small cylindrical body C, such as a small inner ring Ci whose outer diameter is not greater than several millimeters. Therefore, precise measurement cannot be performed with high reproducibility.

Second, since a major portion of measurement work must be performed manually by an operator, measurement requires time and labor, and stable, reliable measurement cannot be performed.

SUMMARY OF THE INVENTION

An object of the present invention is to provide an apparatus for measuring distortion of a cylindrical body which eliminates mechanical contact and enables performance of precise measurement with high reproducibility.

Another object of the present invention is to provide an apparatus for measuring distortion of a cylindrical body which facilitates realization of fully-automated operation, eliminates manual operation, and enables stable, reliable measurement.

In order to achieve the above objects, an apparatus for measuring distortion of a cylindrical body according to the present invention includes: a stationary straight rail provided on a flat surface; a cylindrical-body transfer mechanism for rolling the cylindrical body such that a peripheral surface of one end of the cylindrical body remains in contact with the stationary straight rail; a reference pole disposed at a position separated a predetermined distance from the cylindrical body in a direction perpendicular to the rolling direction of the cylindrical body; a laser scan micrometer capable of simultaneously scanning the other end of the cylindrical body and the reference pole by means of laser beam projected toward the rolling direction to thereby measure a distance between the cylindrical body and the reference pole; and a control section for controlling the cylindrical-body transfer mechanism and the laser scan micrometer and for processing measurement data output from the laser scan micrometer to thereby obtain distortion. By virtue of the above-described configuration, radial distortion of the cylindrical body can be measured.

DETAILED DESCRIPTION OF THE PREFERRED EMBODIMENT

Figure 1:
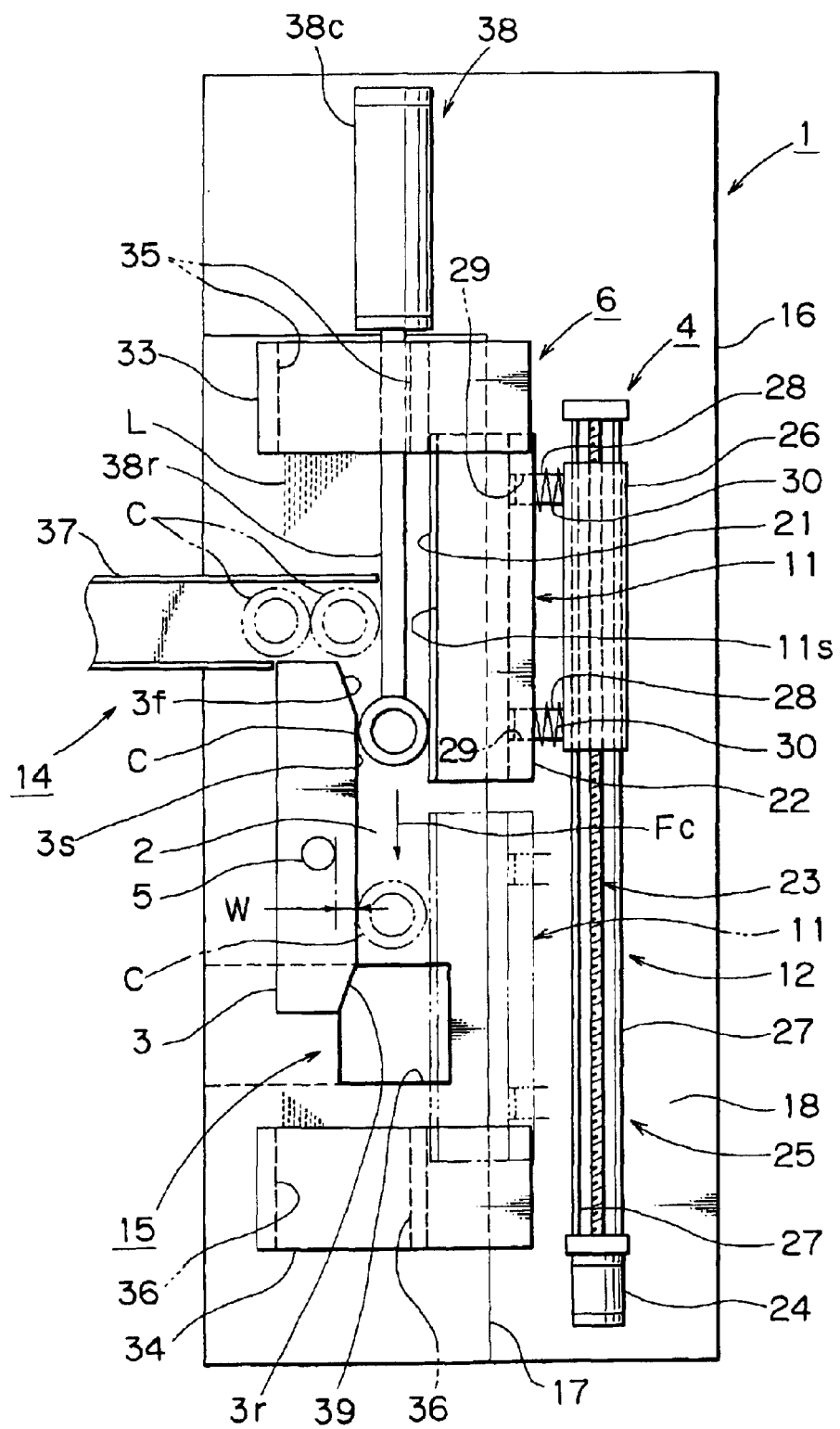
FIG. 1 is a plan view of a distortion measurement apparatus according to a preferred embodiment of the present invention.

An embodiment of the present invention will next be described in detail with reference to the drawings. The accompanying drawings are illustrative of the embodiment and are not meant to limit the scope of the invention. In order to describe the invention clearly, detailed description of known parts is omitted.

First, the structure of a distortion measurement apparatus 1 according to the present embodiment will be described with reference to FIGS. 1 to 4.

In these drawings, reference numeral 16 denotes a base block which has a flat surface 2 at the top thereof. A stationary straight rail 3 is fixedly provided on the flat surface 2 at a central position thereof. The stationary straight rail 3 is formed of a plate member of constant thickness and has a straight side portion 3s on at least one side thereof. The straight side portion 3s has a length for enabling a cylindrical body C serving as an object under measurement to be rolled at least one turn. The degree of straightness of the straight side portion 3s is as high as possible. Further, a front slant side 3f is formed to extend from an entrance-side end portion of the stationary straight rail 3 to the start of the straight side portion 3s in order to facilitate loading of the cylindrical body C; and a rear slant side 3r is formed to extend from the end of the straight side portion 3s to an exit-side end portion of the stationary straight rail 3 in order to facilitate discharge of the cylindrical body C.

A reference pole 5 of a cylindrical columnar shape is provided on the top surface of the stationary straight rail 3 such that the reference pole 5 extends upward from a central portion of the top surface. Thus, the reference pole 5 is disposed at a position separated a predetermined distance from the cylindrical body C in a direction perpendicular to the rolling direction Fc of the cylindrical body C.

Figure 2:
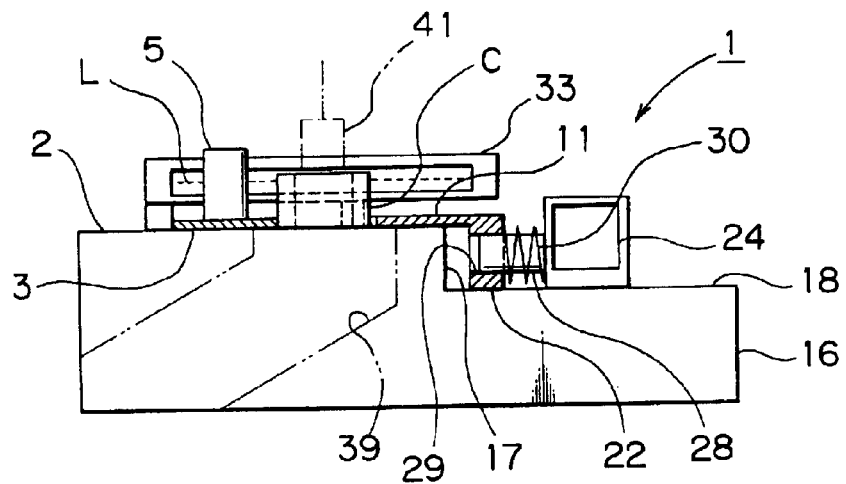
FIG. 2 is a partially sectioned front view of the distortion measurement apparatus.

A movable straight rail 11, which faces the straight side portion 3s of the stationary straight rail 3, is disposed at a position separated a predetermined distance from the straight side portion 3s. The movable straight rail 11 has a plate portion of constant thickness equal to that of the stationary straight rail 3. The plate portion has a straight side portion 11s on at least one side thereof. The straight side portion 11s has a length for enabling the cylindrical body C to be rolled at least one turn. Notably, the degree of straightness of the straight side portion 11s may be relatively low. If necessary, a friction member 21 may be attached to the straight side portion 11s, or the straight side portion 11s may be coated with a friction-imparting material. Meanwhile, as shown in FIG. 2, a lower-level surface 18 is formed on the top surface of the base block 16 with a stepped portion 17 formed between the flat surface 2 and the lower-level surface 18. The movable straight rail 11 has a to-be-supported portion 22, which is integrally formed to extend downward from and perpendicular to a lateral side of the plate portion opposite the straight side portion 11s. The lower end of the to-be-supported portion 22 rests on the lower-level surface 18.

Further, a drive mechanism section 12 is disposed on the lower-level surface 18. The drive mechanism section 12 includes a moving mechanism 25 composed of a ball-screw mechanism 23 and a servomotor 24 for rotating the screw portion of the ball-screw mechanism 23. The moving mechanism 25 further includes a slider 26, which integrally includes the nut portion of the ball-screw mechanism 23. The slider 26 is slidably guided by a pair of guide shafts 27. By virtue of the above-described arrangement, when the servomotor 24 is driven, the slider 26 can be advanced and retracted along the rolling direction Fc of the cylindrical body C, which will be described later. A pair of separated support shafts 28 are provided to project from a side surface 26 and are passed through holes 29 formed in the to-be-supported portion 22. Pressure-application springs 30 are fitted on the support shafts 28 between the slider 26 and the to-be-supported portion 22. Thus, the movable straight rail 11 is urged toward the stationary straight rail 3 and is advanced and retracted together with the slider 26. Therefore, the cylindrical body C held between the stationary straight rail 3 and the movable straight rail 11 can be rolled along the stationary straight rail 3. Notably, the drive mechanism section 12 and the movable straight rail 11 constitute a cylindrical-body transfer mechanism 4.

Figure 3:
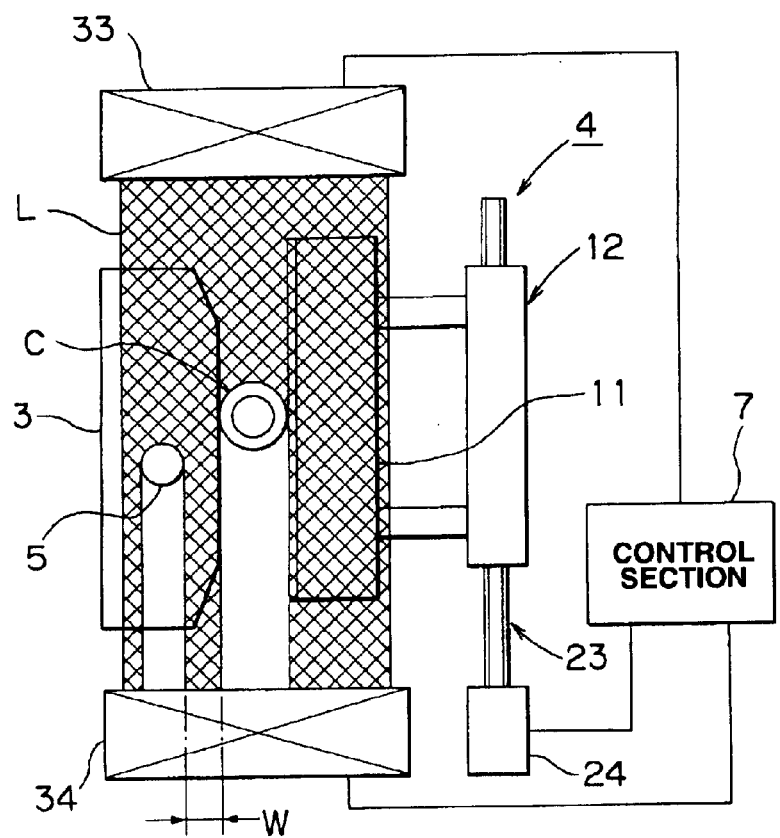
FIG. 3 is a view showing the operation principle of the distortion measurement apparatus.

Meanwhile, a projection unit 33 is disposed on the rear side of the stationary straight rail 3 (the rolling direction Fc is defined to be the front direction); and a beam-detecting unit 34, which constitutes a laser scan micrometer 6 together with a projection unit 33, is disposed on the front side of the stationary straight rail 3. The projection unit 33 is supported by leg portions 35, and the beam-detecting unit 34 is supported by leg portions 36. The projection unit 33 and the beam-detecting unit 34 are connected to a control section 7 (FIG. 3). The above-described servomotor 24 is also connected to the control section 7.

For example, a laser scan micrometer LS-5000 (product name) of Keyence Corp. can be used as the laser scan micrometer 6. In the micrometer, measurement is performed on the basis of the following principle. A laser beam emitted from a semiconductor laser is first reflected by a 12-face polygon mirror and a reflection mirror, and is passed through a collimator lens (F θ lens) to thereby generate parallel (horizontal) laser beam L. This laser beam L is projected from the projection unit 33 in order to scan an upper portion of the cylindrical body C and the reference pole 5 simultaneously. At this time, due to presence of the cylindrical body C and the reference pole 5, the parallel laser beam L produces shadow portions. The beam-detacting unit 34 detects the shadow portions and measures the distance W between the cylindrical body C and the reference pole 5 through calculation processing. Subsequently, the control section 7 processes the measurement data to thereby obtain a distortion Ed of the cylindrical body C. Use of such a laser scan micrometer 6 realizes a sampling speed of 1,200 times/sec and secures a resolution of 0.05 μm. Thus, precise measurement is enabled.

Meanwhile, a cylindrical-body introduction mechanism section 14 for introducing the cylindrical body C into the space between the stationary straight rail 3 and the movable straight rail 11 is provided between the stationary straight rail 3 and the projection unit 33. The cylindrical-body introduction mechanism section 14 includes a shooter mechanism 37 and a loading mechanism 38. The shooter mechanism 37 is disposed perpendicular to the stationary straight rail 3 to be located on the rear side of the stationary straight rail 3. The shooter 37 has a certain inclination in order to enable automatic feed; i.e., to cause a cylindrical body C located at the head of a line of the cylindrical bodies C to come into contact with the straight side portion 11s of the movable straight rail 11 when located at its home position. The loading mechanism 38 includes an air cylinder 38c and a push rod 38r integrally provided on a drive rod of the air cylinder 38c. Upon advancement of the push rod 38r, the cylindrical body C located at the head can be loaded to a rolling start position defined between the stationary straight rail 3 and the movable straight rail 11.

Moreover, a cylindrical-body discharge mechanism section 15 for discharging the cylindrical body C from the space between the stationary straight rail 3 and the movable straight rail 11 is provided between the stationary straight rail 3 and the beam-detecting unit 34. The cylindrical-body discharge mechanism section 15 is constituted by a discharge opening 39 formed in the base block 16. Preferably, the discharge opening 39 is formed on the front side of the end position of the straight side portion 3s of the stationary straight rail 3.

If necessary, as shown in FIG. 2, a weight 41 may be placed on the cylindrical body C in order to prevent the cylindrical body C from lifting during the course of rolling.

Figure 5:
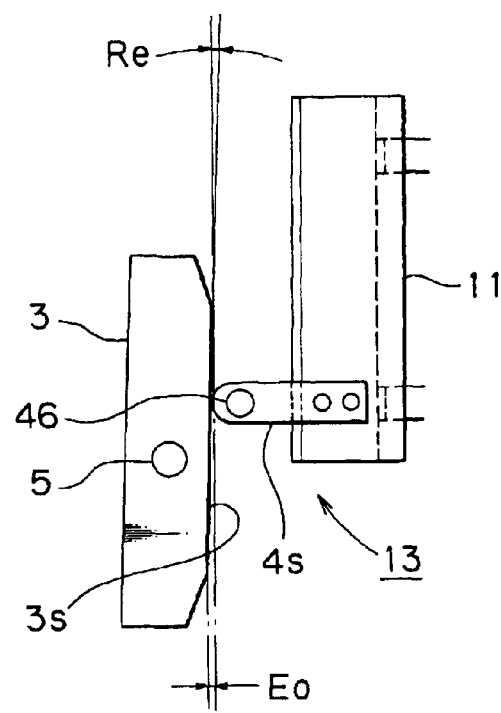
FIG. 5 is an explanatory view showing a correction function section of the distortion measurement apparatus.

In order to determine the distortion Ed of the cylindrical body C, a variation in distance is measured while the cylindrical body C is rolled at least one turn. Therefore, the straight side portion 3s of the stationary straight rail 3 must completely coincide with the projection direction of the laser beam L. However, since attainment of complete coincidence is not easy, in the present embodiment, a correction function section 13 is provided as shown in FIG. 5 in order to perform zero correction for canceling out an error angle Re of the straight side portion 3s with respect to the projection direction of the laser beam L. The correction function section 13 shown in FIG. 5 includes a detection element 45 fixed to the movable straight rail 11 and a detection pole 46 projecting upward from the top face of the detection element 45. An error Eo can be detected through an operation of moving the movable straight rail 11 while keeping the tip of the detection element 45 in contact with the stationary straight rail 3. The thus-detected error Eo is registered in advance. Notably, the error Eo may be detected by another method in which a master cylindrical body whose distortion Ed can be approximated to zero is prepared in advance, and the master cylindrical body is rolled one turn to thereby detect the error Eo. The above-described correction function section 13 enables measurement of improved accuracy.

Figure 6:
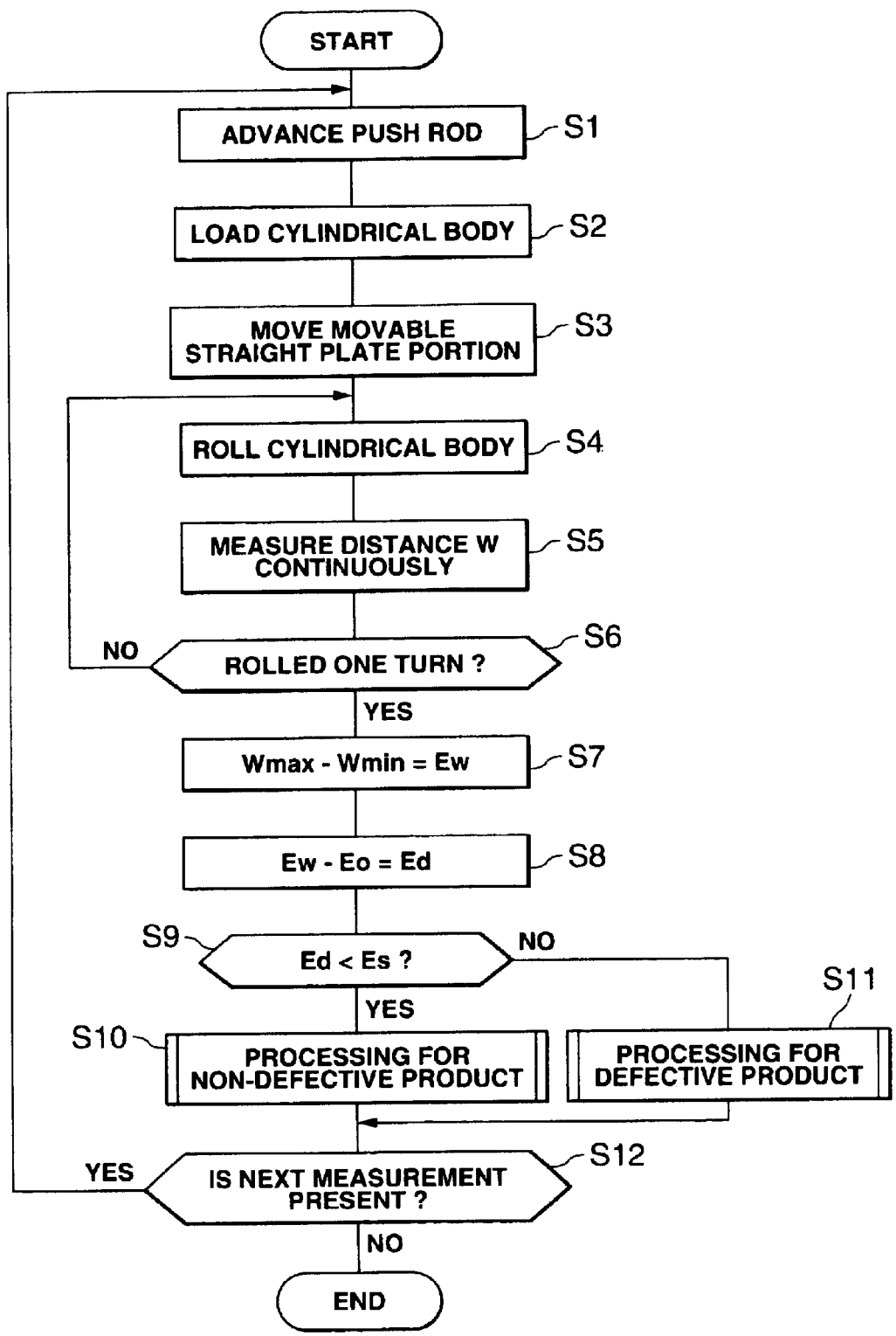
FIG. 6 is a flowchart showing the steps of a method of measuring distortion of a cylindrical body by use of the distortion measurement apparatus.
Figure 8:
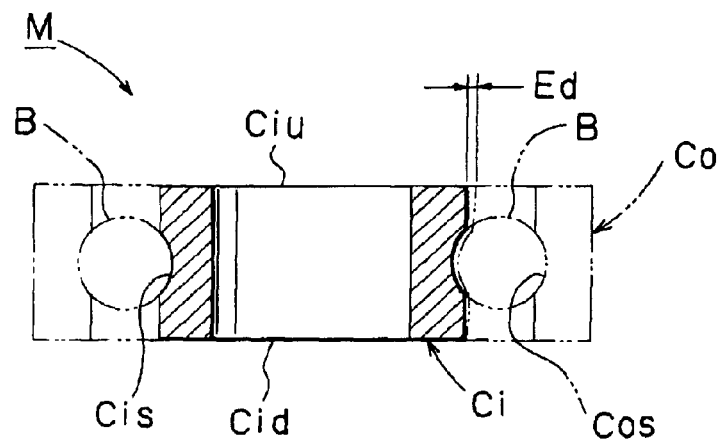
FIG. 8 is a sectional side view of an inner ring of a ball bearing (cylindrical body)
Figure 9:
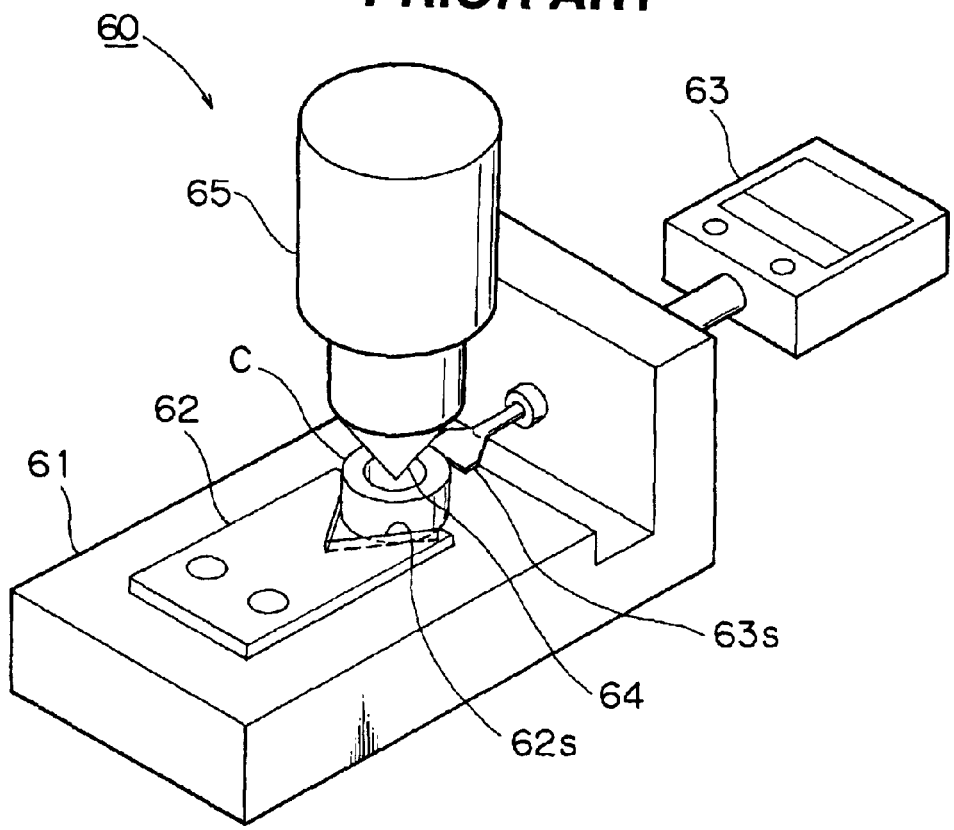
FIG. 9 is a perspective view of a conventional distortion measurement apparatus.

Next, a method of using the distortion measurement apparatus 1 according to the present embodiment as well as a method of measuring distortion of a cylindrical body C will be described in accordance with the flowchart shown in FIG. 6 and with reference to FIGS. 1 to 4. The cylindrical body C to be measured is the inner ring Ci of the ball bearing M shown in FIG. 8.

First, a large number of cylindrical bodies C are supplied from the shooter mechanism 37. When a measurement start command is output from the control section 7, the air cylinder 38c is driven so as to advance the push rod 38r (step S1). Thus, the cylindrical body C at the head of the line of the cylindrical bodies C, which is indicated by a solid line in FIG. 1, is pushed out from the shooter mechanism 37 and is loaded to the rolling start position between the stationary straight rail 3 and the movable straight rail 11 (step S2). At this time, the movable straight rail 11 stands by at the home position shown in FIG. 1 and is urged toward the stationary straight rail 3 by the pressure-application springs 30. Therefore, the cylindrical body C is pushed under pressure to the space between the stationary straight rail 3 and the movable straight rail 11.

Subsequently, when the control section 7 outputs a command for operating the servomotor 24, the servomotor 24 operates in order to move the slider 26 toward the rolling direction Fc of the cylindrical body C, and moves the movable straight rail 11 in the same direction (step S3). Thus, the cylindrical body C rolls while maintaining contact with the stationary straight rail 3 (step S4).

Figure 4:
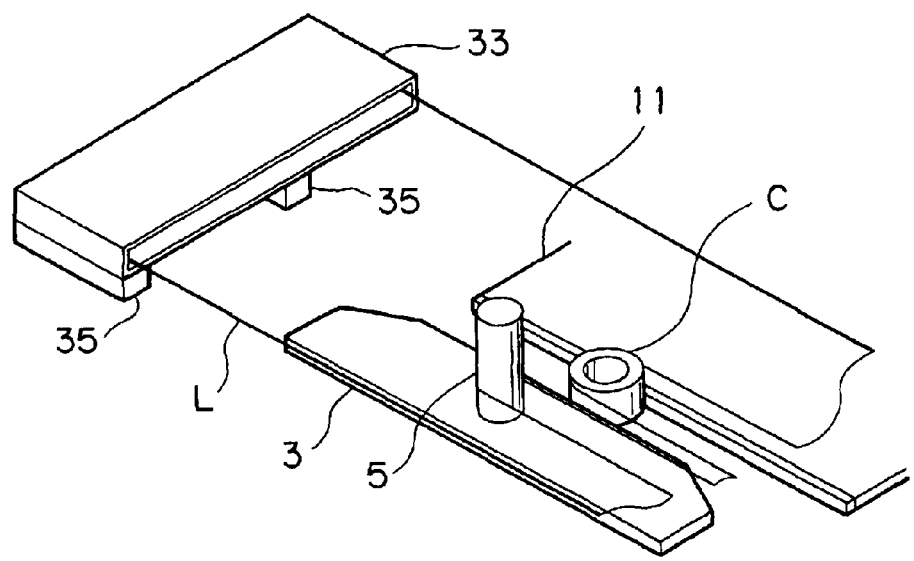
FIG. 4 is a perspective view showing a main portion of the distortion measurement apparatus.

Meanwhile, the projection unit 33 projects laser beam L, which is parallel to a horizontal plane, and the beam-detecting unit 34 receives the beam. At this time, as shown in FIG. 4, the laser beam L scans the upper portion of the cylindrical body C and the reference pole 5 simultaneously. At this time, due to presence of the cylindrical body C and the reference pole 5, the parallel laser beam L produces shadow portions. On the basis of the shadow portions, the laser scan micrometer 6 measures the distance W between the cylindrical body C and the reference pole 5. Since the cylindrical body C rolls, the measurement of the distance W is performed continuously (step S5). The term "continuously" means collection of a large number of measurement data sets at constant sampling intervals, preferably at intervals that are as short as possible.

After the cylindrical body C has rolled one turn, the maximum value Wmax and minimum value Wmin of the distance W are obtained from the measurement data, and the distortion Ew is obtained from the difference therebetween (steps S6 and S7). Further, since the correction amount Eo has been registered in advance, the correction amount Eo is subtracted from the thus-obtained distortion Ew to thereby obtain a corrected distortion Ed (step S8). Subsequently, the distortion Ed is compared with a reference value (threshold) Es. When Ed<Es, processing for a non-defective product is performed (steps S9 and S10). When Ed≧Es, processing for a defective product is performed (steps S9 and S11). When the cylindrical body C has rolled to the end position, the cylindrical body C falls into the discharge opening 39 so as to be discharged. All the above-described measurement steps can be automated. When another cylindrical body C to be measured next is present, the above-described measurement steps are repeated (step S12).

As described above, the distortion measurement apparatus 1 according to the present embodiment can perform precise measurement with high reproducibility, because the measurement is performed by means of laser beam L, which does not involve mechanical contact. Further, since full-automation can be realized with ease, manual operation can be eliminated, and stable, reliable measurement can be performed. In particular, a small cylindrical body having a diameter not greater than several millimeters, such as an inner or outer ring of a bearing, can be measured accurately. In addition, by virtue of provision of the cylindrical-body introduction mechanism section 14 for introducing the cylindrical body C into the space between the stationary straight rail 3 and the movable straight rail 11 and the cylindrical-body discharge mechanism section 15 for discharging the cylindrical body C from the space between the stationary straight rail 3 and the movable straight rail 11, the entire measurement operation from supply of the cylindrical body C to the discharge thereof can be completely automated.

Figure 7:
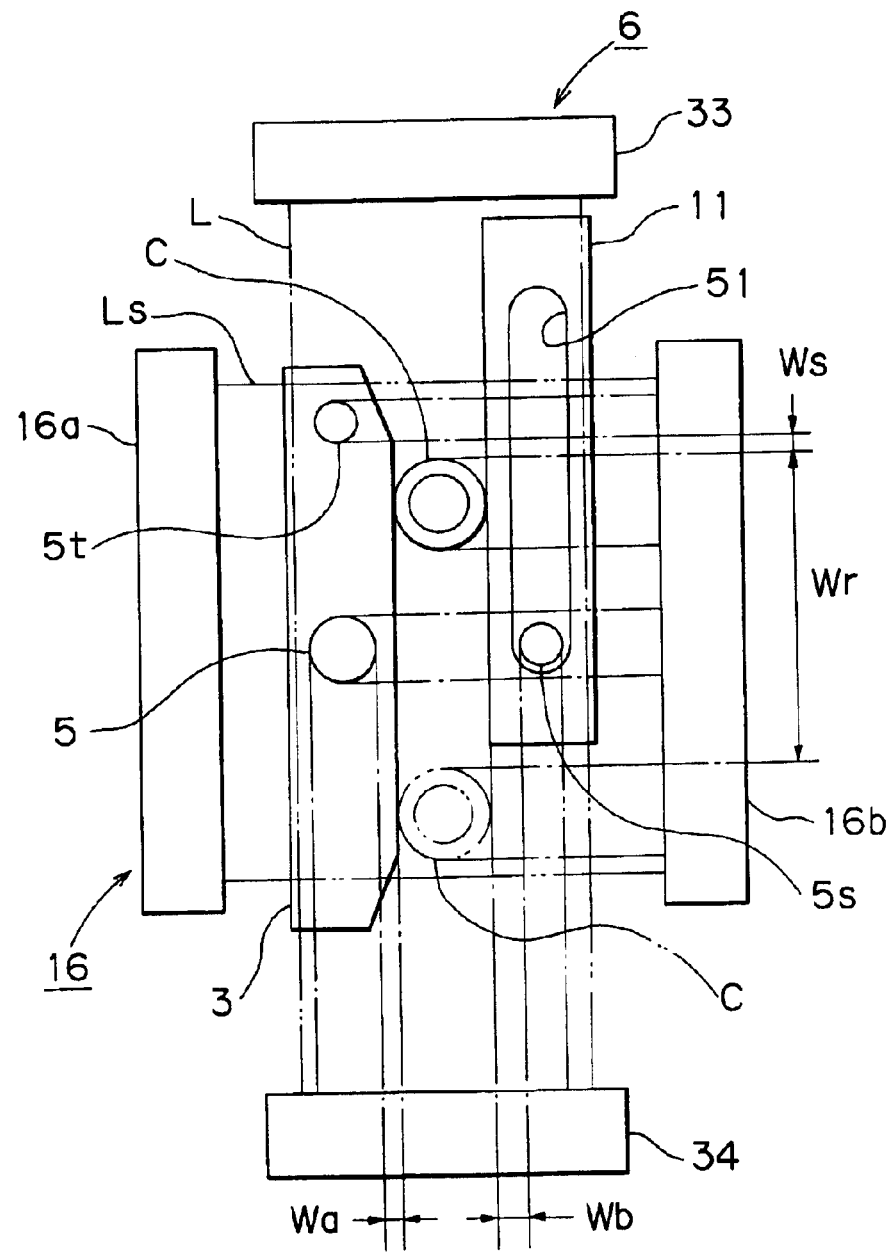
FIG. 7 is a schematic plan view of a distortion measurement apparatus according to a modified embodiment of the present invention.

FIG. 7 shows a modified embodiment. In the modified embodiment, in addition to the reference pole 5, a second reference pole 5s is provided on the side of the movable straight rail 11. In this case, the reference pole 5s is fixed directly to the flat face 2; and an opening 51 is provided in the movable straight rail 11 in order to avoid interference with the reference pole 5s. This configuration enables simultaneous measurement of two distances Wa and Wb, and therefore, more accurate distortion Ed having a further reduced error can be obtained through obtainment of an average value or other suitable processing.

In the modified embodiment, in addition to the laser scan micrometer 6, a second laser scan micrometer 16 is provided perpendicular to the laser scan micrometer 6 so as to measure the amount of movement of the cylindrical body C. In the embodiment of FIG. 1, the position and movement amount of the cylindrical body C can be obtained by means of the loading mechanism 38, the servomotor 24, etc. However, in the present, modified embodiment, the position and movement amount of the cylindrical body C can be obtained more accurately by use of the second laser scan micrometer 16. That is, a third reference pole 5t is provided on the stationary straight rail 3. Thus, the rolling start position can be obtained accurately from the distance Ws between the reference pole 5t and the cylindrical body C; and the movement amount Wr of the cylindrical body C can be obtained accurately from the rolling start position and the position of the cylindrical body C at the rolling end position. In this case, the outer diameter of the reference pole 5 is rendered greater than that of the reference pole 5t, so as to eliminate influence of the reference pole 5t on the measurement of the distance Wa between the reference pole 5 and the cylindrical body C. Notably, in FIG. 7, reference numeral 16a denotes a projection unit of the laser scan micrometer 16; reference numeral 16b denotes a beam-detecting unit of the laser scan micrometer 16; and reference letter Ls denotes laser beam projected from the projection unit 16a.

While the present invention has been described with reference to the preferred embodiment (and the modified embodiment), the present invention is not limited thereto. Regarding structural details, shapes, numbers, materials, among others, modifications and any omission or addition may be possible as needed without departing from the scope of the invention. For example, cylindrical bodies which are most suitable to the distortion measurement apparatus of the present invention are inner and outer rings Ci and Co of ball bearings M. However, roller bearings and other cylindrical bodies are not excluded. Further, the term "cylindrical body" used in the present specification encompasses a cylindrical columnar body.

What is claimed is:

1. An apparatus for measuring distortion of a cylindrical body, comprising:
   a stationary straight rail provided on a flat surface;
   a cylindrical-body transfer mechanism for rolling the cylindrical body, the cylindrical body having an axis which is perpendicular to the flat surface and rolling such that a peripheral surface of one end of the cylindrical body remains in contact with the stationary straight rail;
   a reference pole disposed at a position separated a predetermined distance from the cylindrical body in a direction perpendicular to the rolling direction of the cylindrical body;
   a laser scan micrometer for simultaneously scanning the other end of the cylindrical body and the reference pole by means of laser beam projected toward the rolling direction to thereby measure a distance between the cylindrical body and the reference pole; and
   a control section for controlling the cylindrical-body transfer mechanism and the laser scan micrometer and for processing measurement data output from the laser scan micrometer to thereby obtain a radial distortion of the cylindrical body.

2. The apparatus for measuring distortion of a cylindrical body according to claim 1, wherein the cylindrical body is an inner or outer ring of a bearing.

3. The apparatus for measuring distortion of a cylindrical body according to claim 1, wherein the stationary straight rail is formed of a plate member of constant thickness and has a straight side portion on at least one side thereof, the straight side portion having a length for enabling the cylindrical body to be rolled at least one turn.

4. The apparatus for measuring distortion of a cylindrical body according to claim 3, wherein the stationary straight rail has a front slant side extending from an entrance-side end portion of the stationary straight rail to the start of the straight side portion, and a rear slant side extending from the end of the straight side portion to an exit-side end portion of the stationary-straight rail.

5. The apparatus for measuring distortion of a cylindrical body according to claim 1, wherein the cylindrical-body transfer mechanism includes a movable straight rail disposed to face the stationary straight rail, and a drive mechanism for moving the movable straight rail along the stationary straight rail, while urging the movable straight rail toward the stationary straight rail, to thereby roll the cylindrical body, held between the stationary straight rail and the movable straight rail, along the stationary straight rail.

6. The apparatus for measuring distortion of a cylindrical body according to claim 5, wherein the movable straight rail has a plate portion which has a constant thickness and a straight side portion on at least one side thereof, the straight side portion having a length for enabling the cylindrical body to be rolled at least one turn.

7. The apparatus for measuring distortion of a cylindrical body according to claim 5, further comprising a cylindrical-body introduction mechanism for introducing the cylindrical body into a space between the stationary straight rail and the movable straight rail.

8. The apparatus for measuring distortion of a cylindrical body according to claim 7, wherein the cylindrical-body introduction mechanism includes a shooter mechanism disposed perpendicular to the stationary straight rail to be located on the rear side of the stationary straight rail with respect the rolling direction of the cylindrical body, and a loading mechanism including an air cylinder and a push rod integrally provided on a drive rod of the air cylinder, wherein upon advancement of the push rod, the cylindrical body located at the head is loaded to a rolling start position.

9. The apparatus for measuring distortion of a cylindrical body according to claim 5, further comprising a cylindrical-body discharge mechanism for discharging the cylindrical body from the space between the stationary straight rail and the movable straight rail.

10. The apparatus for measuring distortion of a cylindrical body according to claim 9, wherein the cylindrical-body discharge mechanism includes a discharge opening provided on the front side of the end position of the straight side portion of the stationary straight rail with respect to the rolling direction of the cylindrical body, the cylindrical body falling down through the discharge opening.

11. The apparatus for measuring distortion of a cylindrical body according to claim 1, further comprising a correction function section for correcting an error angle of the stationary straight rail.

12. The apparatus for measuring distortion of a cylindrical body according to claim 1, wherein the reference pole is disposed on one side of the cylindrical body.

13. The apparatus for measuring distortion of a cylindrical body according to claim 1, wherein the reference pole is disposed on both sides of the cylindrical body.

14. The apparatus for measuring distortion of a cylindrical body according to claim 1, further comprising a second laser scan micrometer which is disposed perpendicular to the laser scan micrometer and adapted to measure movement of the cylindrical body.

15. An apparatus for measuring distortion of a cylindrical body, comprising:
   a stationary straight rail provided on a flat surface;
   a cylindrical-body transfer mechanism for rolling the cylindrical body such that a peripheral surface of one end of the cylindrical body remains in contact with a straight side portion of the stationary straight rail;
   a reference pole disposed at a position separated a predetermined distance from the cylindrical body in a direction perpendicular to the rolling direction of the cylindrical body;
   a laser scan micrometer for simultaneously scanning the other end of the cylindrical body and the reference pole by means of laser beam projected toward the rolling direction to thereby measure a distance between the cylindrical body and the reference pole; and
   a control section for controlling the cylindrical-body transfer mechanism and the laser scan micrometer and for processing measurement data output from the laser scan micrometer to thereby obtain a radial distortion of the cylindrical body.

16. The apparatus for measuring distortion of a cylindrical body according to claim 15, wherein the cylindrical body is an inner or outer ring of a bearing.

17. The apparatus for measuring distortion of a cylindrical body according to claim 15, wherein the stationary straight rail is formed of a plate member of constant thickness, the straight side portion being on at least one side thereof, the straight side portion having a length for enabling the cylindrical body to be rolled at least one turn.

18. The apparatus for measuring distortion of a cylindrical body according to claim 17, wherein the stationary straight rail has a front slant side extending from an entrance-side end portion of the stationary straight rail to the start of the straight side portion, and a rear slant side extending from the end of the straight side portion to an exit-side end portion of the stationary-straight rail.

19. The apparatus for measuring distortion of a cylindrical body according to claim 15, wherein the cylindrical-body transfer mechanism includes a movable straight rail disposed to face the stationary straight rail, and a drive mechanism for moving the movable straight rail along the stationary straight rail, while urging the movable straight rail toward the stationary straight rail, to thereby roll the cylindrical body, held between the stationary straight rail and the movable straight rail, along the stationary straight rail.

20. The apparatus for measuring distortion of a cylindrical body according to claim 19, wherein the movable straight rail has a plate portion which has a constant thickness and a straight side portion on at least one side thereof, the straight side portion having a length for enabling the cylindrical body to be rolled at least one turn.

* * * * *